UNITED STATES PATENT OFFICE.

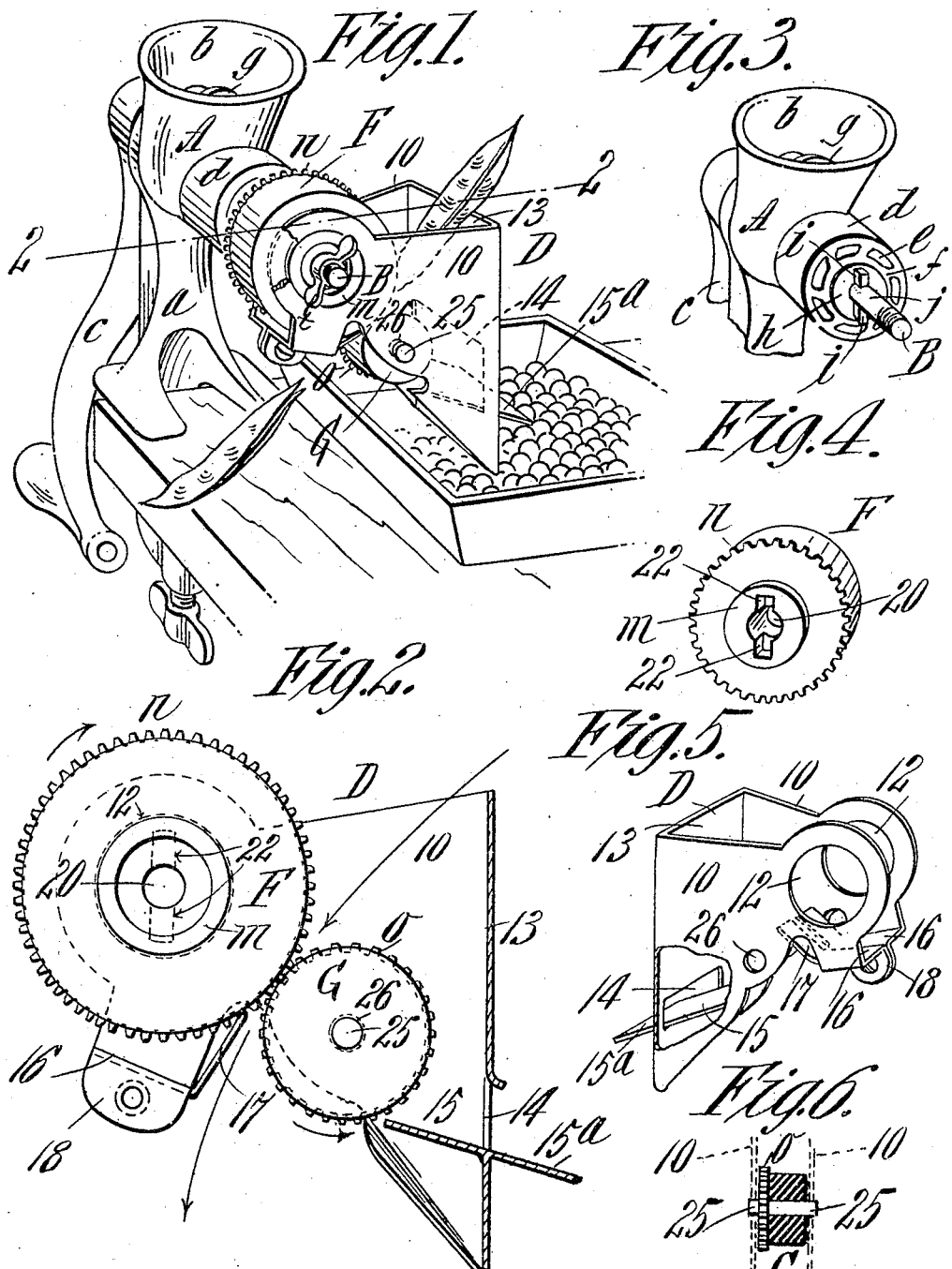

CASPAR METTLER, OF NEW HAVEN, CONNECTICUT, ASSIGNOR OF ONE-HALF TO LUMAN S. BROWN, OF SPRINGFIELD, MASSACHUSETTS.

PEA-SHELLING DEVICE.

No. 851,544.  Specification of Letters Patent.  Patented April 23, 1907.

Application filed September 24, 1906. Serial No. 335,857.

*To all whom it may concern:*

Be it known that I, CASPAR METTLER, a citizen of the United States of America, and a resident of New Haven, in the county of New Haven and State of Connecticut, have invented certain new and useful Improvements in Pea-Shelling Devices, of which the following is a full, clear, and exact description.

The object of this invention is to provide a device or machine of simple character which is efficient for the rapid shelling of peas or like pod enclosed vegetables,—susceptible in use of having the pods run through and between a pair of rolls whereby the pods will be broken open and the peas therein crowded out to roll away and fall from the rear of the rolls while the pods are fed and discharged forwardly of the rolls.

Another object of the invention is to construct the pea shelling device so as to be used as an attachment for and to have cooperation with parts of a meat reducing or food chopping machine, of a well known description, so that such food reducing machine together with the pea shelling appliance to be combined therewith and detached therefrom at the convenience of the user is rendered more than ordinarily useful in a household.

The present improvements are hereinafter described in connection with the accompanying drawings and set forth in the claims.

In the drawings,—Figure 1 is a perspective view showing a meat reducing machine having the pea shelling attachment mounted thereon for use for pea shelling. Fig. 2 is a sectional elevation, on a larger scale, through the pea shelling attachment,—parts of the casing shown in vertical section being as seen on the plane indicated by line 2—2, Fig. 1. Fig. 3 is a perspective view of the upper portion of an ordinary meat reducing machine, having the rotary shaft thereof adapted for receiving engagement therewith of the pea shelling device, which latter in this view is not shown. Fig. 4 is a perspective view of one of the rolls included in the new device. Fig. 5 is a perspective view of the casing. Fig. 6 is a sectional view on the plane of its axis of the smaller one of the pair of rolls included in the device.

Similar characters of reference indicate corresponding parts in all of the views.

In the drawings,—A represents a meat reducing or food chopping machine of a generally well-known description, the same comprising a stand $a$ to be clamped at the edge of the table or other support and formed with an upwardly opened hopper $b$, and a hollow cylindrical extension $d$ at the base of the hopper provided with an end wall $f$ having apertures $e$ through which the comminuted meat or other substance is expelled by the screw $g$ which is carried on a shaft B having a crank $c$.

The shaft at its forward end is constructed with a shoulder $h$, Fig. 3, provided with lugs $i$ $i$ and a screw threaded axial shaft extension $j$.

The pea shelling device made as an attachment for, and to have cooperation with, the meat reducing machine above briefly referrred to, will be now described:

D represents a casing comprising opposite side walls or cheeks 10, 10, having opposite axially aligned, comparatively large, journal holes 12, 12, at the upper forward portions thereof, and comprising a rear wall 13, having an opening 14 through a lower portion thereof and having a downwardly and rearwardly inclined bottom or guide 15 leading to said rearward opening, and by the extension 15$^a$ projected beyond the wall 13.

The casing as shown in Figs. 1, 2, and 5, at a forward portion thereof, and generally below the location of the aforementioned journal holes 12, 12, is constructed with a transverse uniting portion or portions 16 formed with a guard extension plate or member 17 having an upward and rearward inclination.

The aforementioned casing may be made of a single blank of sheet metal, the intermediate portion thereof forming the back 13, while portions bent at right angles and in suitable separation from each other constitute the sides or cheeks, and the members 16, 16, again substantially right angularly turned to the sides constitute the transverse uniting portion, the same having matched ear lugs 18 fastened together by screws, rivets, or otherwise.

F represents a roll having opposite end hubs $m$ of slight axial extent, the same being sprung or otherwise engaged in place within the journal holes 12, 12, of the casing sides, said roll having also a hole 20 axially therethrough whereby it is fitted onto the extension $j$ of the rotary shaft B, and by the sockets 22 within the face of one of the hubs, which is located towards the apertured end wall $f$ of the meat reducing machine, engagement is made between the roll F and shaft B whereby the latter will be positively turned in unison with the former. The thumb nut $t$ clamps the device in its supporting engagement on the shaft B.

G represents a second roll, advantageously of smaller diameter than that of the roll F; and this smaller roll is journaled within the casing D by having journals or axial studs 25 fitting in journal holes 26 in the opposite side walls 10, 10, of the casing. The smaller roll is positioned peripherally adjacent to, but not in contact with, the roll F, and it is located with its axis below and to the rear of the axis of the larger roll. The body of the roll G may advantageously be made of semi-elastic rubber.

The comparatively short rolls F and G have on their ends intermeshing spur gear wheels $n$ and $o$ so that by turning of the shaft B both of the rolls are rotated for the pod feeding and pea expelling action.

As an occasion may render desirable, the improved device or pea shelling attachment is mounted in place in its combination with the shaft of the machine A, and while the shaft is being continuously turned, the peas in pods may be rapidly fed in succession between the rolls F and G with the effect of compressing the pods, breaking them open; and while the pods in flattened condition are fed and discharged forwardly and downwardly, the peas, which are crowded out from the opened pods by the rolls, will roll rearwardly to fall from the lower and smaller roll $g$ onto the downwardly and rearwardly inclined bottom or guide 15 of the casing, to be conveyed through the opening 14 into a shallow pan or other receptacle in place therefor.

The guard 17, the edge of which is in contact against or proximity to the periphery of the roll F prevents any of the flattened pods which might adhere to the roll from being carried around with the roll to a second time pass between the pair of rolls.

It will be seen that, during use of the device, rotation of the casing will be prevented by the engagement of the lower end of the rear wall 13 with the bottom of the receptacle into which the peas are being shelled, the wall being extended downward below the rolls for this purpose.

I claim:—

1. In a pea shelling device, the combination with an upright standard having a basal screw clamp for securing it to the edge of a table, and a horizontal shaft journaled in said standard and projecting to one side thereof and provided with suitable operating means at the other side, of a roller mounted on the projecting portion of said shaft so as to be slidably removable therefrom, a removable casing having vertical opposed side walls including said roller between them and both walls being distinct from said standard, a second roller disposed to co-operate with the other and rotatably supported by and between said side walls, and means mounted on the end of the shaft for locking said casing and rollers against removal from the standard and shaft except when desired.

2. In a pea shelling device, the combination with an upright standard having means for securing it to the edge of a table, and a horizontal shaft journaled in said standard and projecting to one side thereof and provided with suitable operating means, of a roller removably mounted on the projecting portion of said shaft and provided with circular end bosses of less diameter than the roller, a casing having opposed vertical side walls embracing said roller and provided with registering apertures encircling said bosses, whereby the casing and roller are rendered removable as one member from said shaft, and a second roller disposed to co-operate with the other and rotatably supported by and between said side walls for removal with the casing.

3. In a pea shelling device, the combination with a standard having means for securing it in an upright position to the edge of a table, and a horizontal shaft journaled in said standard and projecting to one side thereof, of a roller removably mounted on the projecting portion of said shaft, a casing provided with opposed side walls embracing said roller and mounted thereon, and a second roller disposed to co-operate with the first and rotatably supported by and between said side walls, said casing having also an end wall parallel to said rollers and depending therebeneath to a point adjacent the base of the standard to serve as an abutment to prevent rotation of the casing.

4. A pea-shelling attachment for meat choppers consisting of a metal casing having two opposed side walls and an end wall, said side walls being provided with registering journal apertures, a roller having circular end bosses of reduced diameter journaled in said apertures and having further an axial opening passing through said bosses and the body of the roller and means for coupling said roller removably with an enclosed shaft, and a second roller disposed to co-operate with the first and rotatably supported by and between said side walls, whereby the casing and rollers form one unitary member.

5. A pea-shelling attachment for meat choppers consisting of an integral casing formed of a sheet of metal bent to present two opposed side walls and an end wall, said side walls in their portions remote from said end wall being provided with registering journal apertures and beneath said apertures with inward directed uniting webs having registering apertures for a clamping bolt, a roller disposed above said uniting webs and having circular end bosses of reduced diameter journaled in said apertures and having further an axial opening passing through said bosses and the body of the roller and means for coupling said roller removably with an enclosed shaft, and a second roller disposed to co-operate with the first and rotatably supported by and between said side walls, whereby the casing and rollers form one unitary member.

Signed by me at New Haven, Conn, in presence of two subscribing witnesses.

CASPAR METTLER.

Witnesses:
 FREDERICK H. BRETHAUER,
 JOHN R. BOOTH.